Patented Sept. 11, 1945

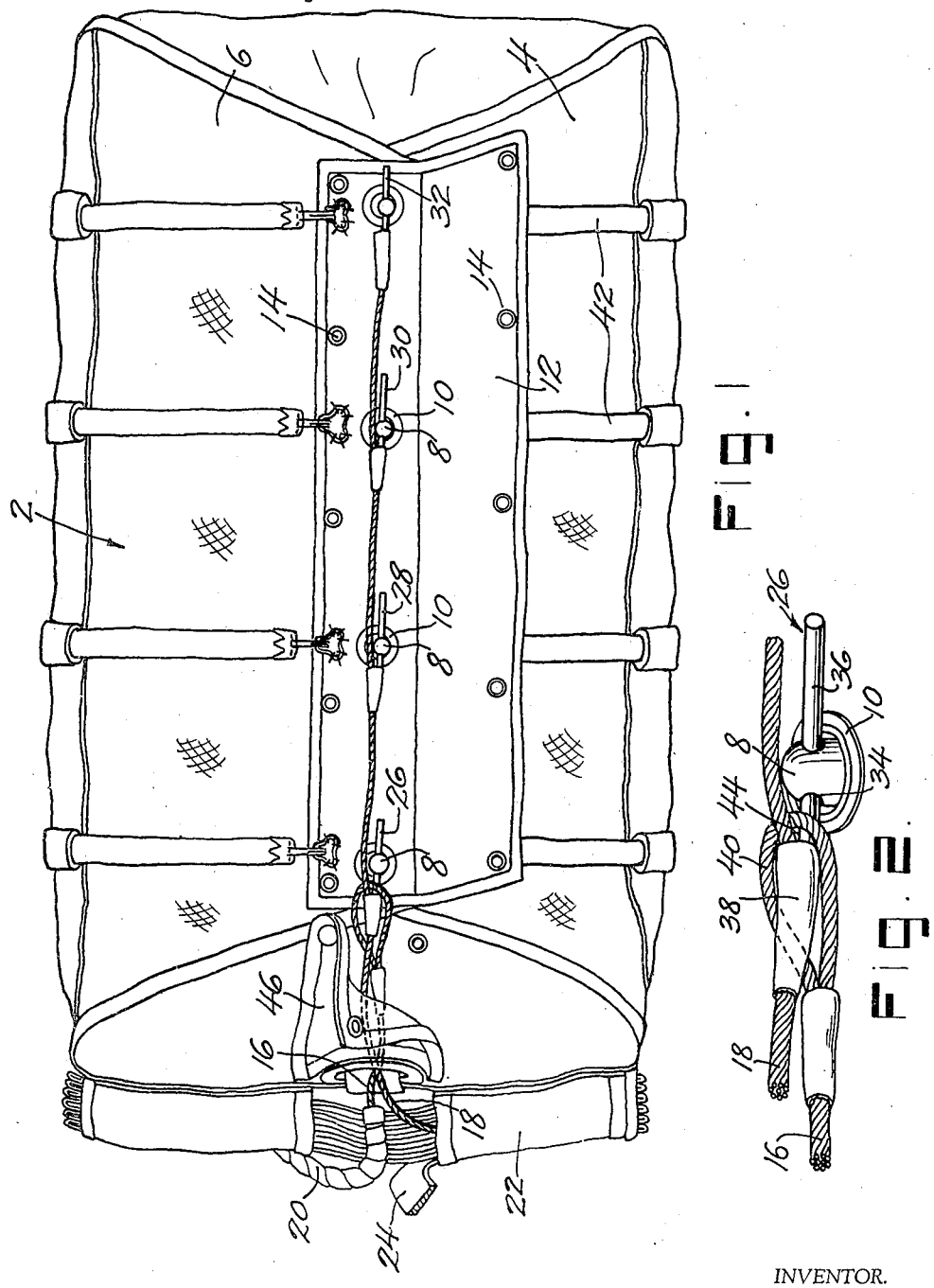

2,384,651

UNITED STATES PATENT OFFICE 2,384,651

DUAL RELEASE MECHANISM

Floyd Smith, Manchester, Conn., assignor to Pioneer Parachute Company, Inc., Manchester, Conn., a corporation of Connecticut Application August 12, 1943, Serial No. 498,392

2 Claims. (Cl. 244—149)

My invention relates to parachute releasing means and particularly to dual release mechanism whereby either one of two alternative means may be operated to release a parachute from its pack or container.

Dual release mechanisms are known but they have heretofore been complicated and heavy in construction and expensive to produce. A much more serious objection to prior dual release mechanisms resides in the fact that they have been formed with a number of relatively movable parts which are closely positioned and therefore may very easily become clogged with sand or dirt or so bent or twisted that they will jamb and fail to operate.

In accordance with my invention these objections to constructions of the prior art are overcome and dual release mechanism provided which is of the utmost simplicity and very economical to produce. The elements of the mechanism may be made without any machining of parts and are so freely movable that it is impossible for them to jamb, whereas they are so connected as to be certain in their operation.

One of the objects of my invention is to provide a novel type of dual release mechanism for parachute packs.

Another object of my invention is to provide a parachute pack with two independently operable means for releasing the parachute from the pack and means releasably connecting one of said releasing means to the other.

A further object of my invention is to provide dual release mechanism which is simple and economical to produce, light in weight, certain in its operation and practically incapable of jambing or sticking when operated.

These and other objects and features of my invention will appear from the following description thereof in which reference is made to the figures of the accompanying drawing.

In the drawing:

Fig. 1 is a perspective of a portion of a parachute pack having a typical form of dual release mechanism embodying my invention applied thereto, and Fig. 2 is an enlarged perspective of a portion of the construction illustrated in Fig. 1.

In that form of my invention chosen for purposes of illustration and to indicate the nature of my invention a very simple construction is shown applied to a parachute pack 2 which may be of any conventional or preferred type or style and formed of fabric or other material with flexible flaps 4 and 6 which are arranged in overlapping relation to hold the pack closed. It will be evident that the number, shape and arrangement of such flaps may be varied as desired and any other suitable type of pack enclosing means may be used.

As shown the pack flaps are retained in place by conventional means consisting of locking cones 8 carried by the lower pack flap 4 and extending through grommets 10 on the upper pack flap 6. A protecting cover member 12 is secured to the flap 6 and arranged to be folded over the cones and grommets and over the releasing means to protect them from injury or accidental release. The cover shown is of conventional construction and provided with snap fasteners 14 for holding it in closed, protecting position.

The releasing means employed may include a manually actuated rip cord and an automatically operated rip cord, such as a static line, or they may include any other independently operable releasing means. One of these releasing means includes the cable 16 and the other includes the cable 18. The cable 16 is shown as passing through the cable housing 20 and is designed to be connected to the usual manually operated rip cord handle (not shown), whereas the cable 18 is shown as passing into the static line holder 22 where it is attached to the static line 24. However, it is understood that each of the cables may be otherwise arranged so that when actuated it will serve to pull on one of the cables 16 or 18 to move it to the left as seen in the figures of the drawing.

The cable 18 is provided with locking pins 26, 28, 30 and 32 which pass through the openings 34 in the locking cones 8 and above the grommets 10 to prevent the grommets from slipping off the cones and to retain the pack flaps in their closed positions. As in prior constructions of this type the locking pins are adapted to be pulled from the openings in the cones by the cable 18 to permit the grommets to slide off the cones and allow the pack flaps to be drawn apart in releasing the parachute.

The cable 18 carries all of the locking pins and while the end locking pin 32 extends from the end of the cable 18 locking pins 26, 28 and 30 are fixedly secured to the cable 18 so as to extend to the right therefrom as seen in the drawing. As shown the pins 26, 28 and 30 each have a locking portion 36 which extends parallel to the cable 18 and passes through the openings 34 in the locking cones 8 with which they are associated, whereas the body 38 of each pin is soldered or otherwise firmly secured to the cable 18. The construction thus provided is such that all the pins will be pulled from the cones which they engage when the cable 18 is moved to the left.

In accordance with the present invention the cable 16 which is actuated by the manually operated releasing means is simply provided with a loop or eye 40, preferably located at the end of the cable. This loop is passed about the first locking pin 26 on the cable 18 before the locking portion of the pin is inserted into the opening 34 in the first locking cone. In this way the loop 40 on cable 16 is held on the locking portion 36 of the first pin 26 and between the cone 8 and the body portion 38 of the first pin.

The cable 18 is obviously capable of free and independent movement without interference from the cable 16 and the loop 40 thereon and as a result it may be pulled clear from the pack and remain attached to the static line connected to the aircraft while the user falls therefrom. In order to insure perfectly free and easy withdrawal of the pin 26 from its cone and from the loop 40, the loop preferably is made so large that there is no possibility of jamming of the elements or the imposition of any restriction to the movement of the pin 26 and cable 18. When the cable 18 is pulled, the pin 26 is drawn from its cone in the usual manner and slips through the loop 40 unimpeded and is finally withdrawn from the loop altogether so as to completely disconnect the cable 18 from cable 16 as the cable 18 is stripped from the pack. The pack flaps are then free to be drawn apart by elastics 42 or other retracting means to release the parachute from the pack.

The cable 16 which is connected to the usual manually operable rip cord handle is also designed to be actuated to pull the cable 16 to the left as seen in the drawing. When so actuated the loop 40 on the end of the cable 16 slides freely along the locking portion 36 of the pin 26 to the crotch 44 between the cable 18 and the locking portion of the first locking pin. Thereafter further movement of cable 16 to the left causes the cable 16 to pull the pin carrying portion of the cable 18 and the locking pins from their cones. The pack flaps are thus released by actuation of the manually operated rip cord 16.

In operation and assuming the cable 18 to be designed for automatic release of the pack, a pull on the static line 24 attached to the cable 18 will withdraw all of the pins from the cones with which they are associated and will allow the pin 26 to slip freely through the loop 40 on cable 16 so as to present no interference whatever with the movement of the cable as it is stripped from the pack. On the other hand, when the cable 16, attached to a rip cord handle, is actuated to pull the cable 18 to the left, the pin carrying portion of the cable 18 is also pulled to the left to withdraw all of the locking pins from the cones just as if the whole cable 18 had been actuated by the static line. The pack flaps are thus releasable by either actuating means.

The very simplicity of the construction is one of its greatest virtues. It can be made without any special tools and without employing the complicated, expensive and heavy parts used in dual release mechanisms of the prior art. At the same time it is certain in its operation.

When applied to a parachute pack the usual protecting cover 46 for the cables 16 and 18 is provided to prevent the cables from catching on objects and accidentally releasing the pack flaps as the user moves about. Similarly, other portions of the pack, cover, cables and assembly may be of conventional construction so that the invention may be applied to conventional packs and all of the existing elements in packs already in use can be employed by simple modification of a single element and by operations within the skill of an ordinary mechanic using readily available tools. This fact is of particular advantage when making repairs in the field where spare parts, special mechanics and machine tools are not available.

While I have illustrated and described a preferred form of my invention, it will be apparent that numerous changes may be made in the form, construction and arrangement of the elements thereof without departing from the spirit and scope of the invention as defined by the followings claims.

I claim:

1. In a parachute pack having a cover with overlapping flaps, and cooperating locking cones and grommets for holding said flaps closed about a parachute, dual release mechanism for releasing said grommets from the locking cones including a cable having locking pins carried thereby and projecting through openings in the locking cones and a second cable having a loop thereon extending about one of the locking pins between its associated locking cone and the cable and movable to withdraw all of said locking pins from said cones to release said grommets and permit said flaps to be opened.

2. In a parachute pack having a cover with overlapping flaps, and cooperating locking cones and grommets for holding said flaps closed about a parachute, dual release mechanism for releasing said grommets from the locking cones including a cable attached to a static line and having locking pins thereon extending through openings in said cones and above said grommets to hold said pack flaps closed, and a cable arranged for manual operation and having a loop thereon extending about one of the locking pins between its associated locking cone and the cable and movable to withdraw all of said locking pins from said cones to release said grommets and permit said flaps to be opened.

FLOYD SMITH.